United States Patent
De Haan et al.

(10) Patent No.: US 6,278,736 B1
(45) Date of Patent: *Aug. 21, 2001

(54) MOTION ESTIMATION

(75) Inventors: Gerard De Haan; Paul W. A. C. Biezen; Robert J. Schutten, all of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,700

(22) Filed: May 27, 1997

(30) Foreign Application Priority Data

May 24, 1996 (EP) .................................................. 96201462
Jun. 12, 1996 (EP) .................................................. 96203394

(51) Int. Cl.⁷ ........................................................ H04B 1/66
(52) U.S. Cl. ........................................................ 375/240.16
(58) Field of Search .................................... 348/416, 699, 348/411, 407, 415, 700, 413, 416.1, 411.1, 407.1, 405.1, 413.1; 382/236; 375/240.16, 240.09, 240.01, 240.25

(56) References Cited

U.S. PATENT DOCUMENTS

| | | | |
|---|---|---|---|
| 5,473,379 | * 12/1995 | Horne | 375/240.16 |
| 5,557,341 | * 9/1996 | Weiss et al. | 348/411 |
| 5,572,258 | * 11/1996 | Yokoyama | 348/415 |
| 5,598,215 | * 1/1997 | Watanabe | 348/416 |
| 5,610,658 | * 3/1997 | Uchida et al. | 348/699 |
| 5,619,268 | * 4/1997 | Kobayashi et al. | 348/699 |
| 5,647,049 | * 7/1997 | Odaka et al. | 348/416 |
| 5,731,840 | * 3/1998 | Kikuchi | 348/407 |
| 5,734,737 | * 3/1998 | Chang et al. | 348/416 |
| 5,748,761 | * 5/1998 | Chang et al. | 348/416 |
| 5,812,787 | * 9/1998 | Astle | 375/240.25 |
| 6,005,625 | * 12/1999 | Yokoyama | 348/699 |

FOREIGN PATENT DOCUMENTS

0410826B1   1/1991   (EP) .

* cited by examiner

Primary Examiner—Chris Kelley
Assistant Examiner—Gims S. Philippe
(74) Attorney, Agent, or Firm—Russell Gross

(57) ABSTRACT

In a method of estimating motion vectors, motion parameters (p1–p4) are determined (PC) for a given field (n−1) of a video signal; and motion vectors ( $D(X, n)$ ) for a field (n) of said video signal are determined in dependence upon at least one predetermined motion vector ( $D(x-X, y-Y, n)$, $D(x+X, y-Y, n)$, $D(x, y+2Y, n-1)$ ) and at least one additional motion vector ($PV(X)$) derived (PG) from said motion parameters (p1–p4).

11 Claims, 7 Drawing Sheets

MOTION ESTIMATION

BACKGROUND OF THE INVENTION

1. Field of the Invention

The invention relates to a method and device for estimating motion vectors, and to a video display apparatus comprising such a device.

2. Description of the Related Art

EP-B-0,410,826 [1] discloses a method of performing a recursive motion estimation between a reference image and a current image, to realize a fixed number of iterations, each iteration consisting of:

sampling both images with a resolution which increases at each iteration;

detecting characteristic samples in the reference image;

estimating a local motion vector for each characteristic sample in the reference image, in which the estimation is initialized with a displacement vector derived from a global motion estimation realized in the course of the iteration preceding the current iteration; and carrying out a global motion estimation of the current image, in which values of parameters of a model are calculated on the basis of the local motion vectors estimation in the course of the latest iteration.

To estimate the global motion, the values of 8 parameters a1 ... a8 defining a motion model are calculated, in such a manner that a sample having coordinates X, Y is displaced to coordinates X', Y', where $$X'=(a1.X+a2.Y+a3)/(a7.X+a8.Y+1) \text{ and}$$

$$Y'=(a4.X+a5.Y+a6)/(a7.X+a8.Y+1),$$

the 8 parameters a1 ... a8 being calculated by solving a system of equations with 8 unknowns which is constituted by the two relationships above, written for characteristic samples, the coordinates X', Y' being determined as a function of an estimated local motion vector for each of these samples and as a function of the coordinates X, Y of the sample under consideration.

To estimate a local motion vector for each characteristic sample of the current image, the following steps are carried out:

defining a first block of samples of the reference image, centered on the characteristic sample under consideration;

defining a plurality of second blocks of samples of the current image centered on samples corresponding to the characteristic sample under consideration but shifted over a plurality of vectors to be tested, each vector to be tested being constituted by the vector sum of an initial displacement of the characteristic sample under consideration calculated from the global estimate of motion made in the course of the iteration preceding the iteration in progress, and from an additional displacement taken from a plurality of predetermined additional displacements; and selecting the vector to be tested which yields the best match between the respective second block and the first block to obtain the local motion vector.

It thus appears that in the prior art, a plurality of iterations is carried out between the same images to obtain the final motion vectors corresponding to the highest resolution.

SUMMARY OF THE INVENTION

It is, inter alia, an object of the invention to provide a less complex motion vector estimation. To this end, a first aspect of the invention provides a method of estimating motion vectors as defined in claim 1. A second aspect of the invention provides a motion vector estimation device as defined in claim 10. A third aspect of the invention provides a video display apparatus as defined in claim 11. Advantageous embodiments are defined in the dependent claims.

In a method of estimating motion vectors in accordance with a primary aspect of the present invention, motion parameters are determined for a given field (n−1) of a video signal; and motion vectors for a field (n) of said video signal are determined in dependence upon at least one predetermined motion vector and at least one additional motion vector derived from said motion parameters.

These and other aspects of the invention will be apparent from and elucidated with reference to the embodiments described hereinafter.

DESCRIPTION OF THE PREFERRED EMBODIMENTS

I. Introduction

Motion estimators minimize or maximize a, sometimes complex, but often simple, criterion function, selecting one of various possible motion vectors for every location in the image. They either apply the exhaustive search method, i.e. try all possible vectors in a predefined range, to obtain the global optimum of the criterion function, or use one of the efficient approaches and test a limited number of candidate vectors only [9,10,11,13]. In the more advanced efficient motion estimation methods this limited candidate set contains the most likely, prediction, vectors. The likelihood can be based on analysis of the picture at a higher hierarchical level [2,14], by analysis in the frequency domain [15,16,17], or the likelihood is based on spatial and/or temporal proximity of the vectors in the candidate set [4,5,6,12,19].

Figure 1:
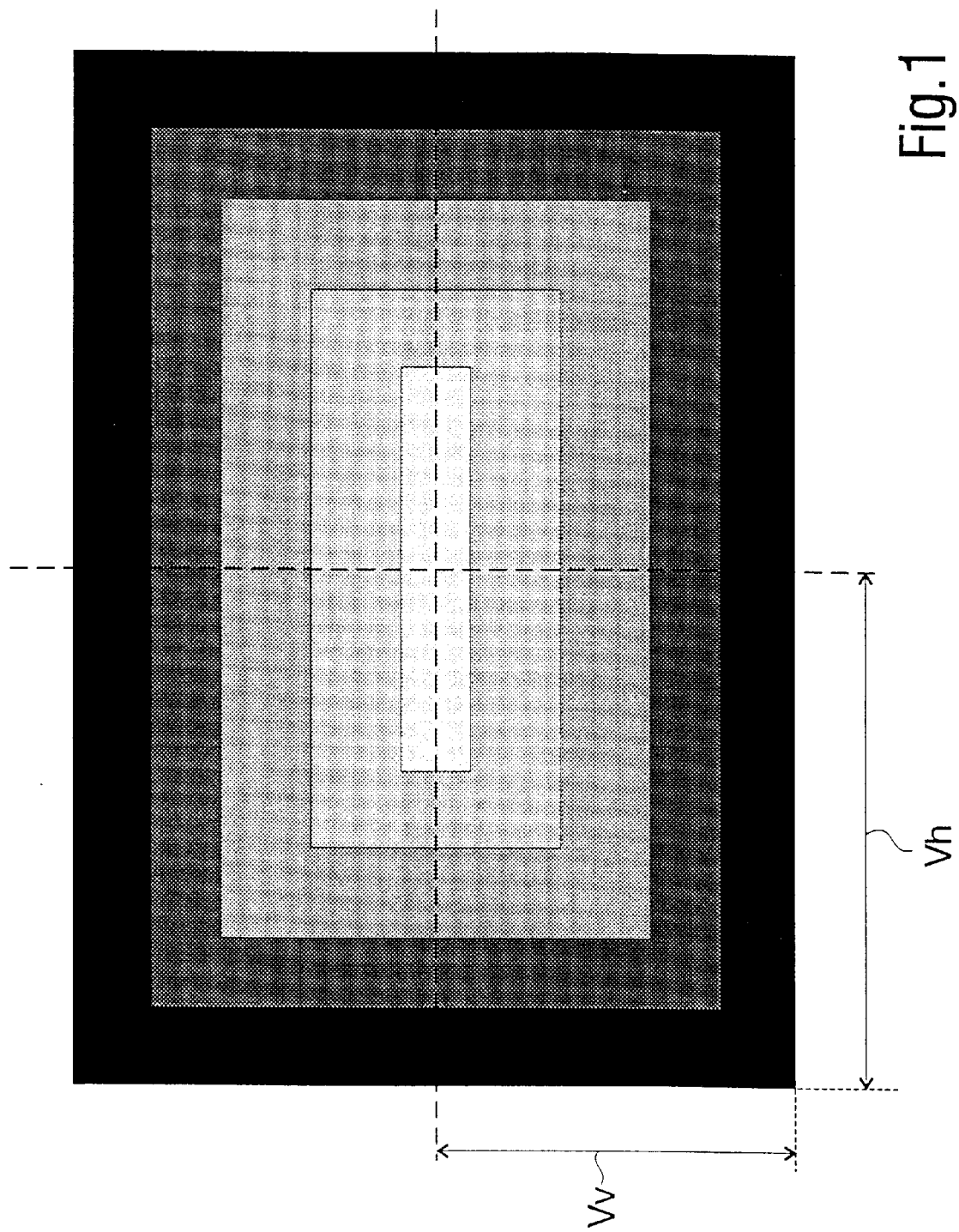
FIG. 1 shows linearly changing motion velocities due to zooming.

Motion in video images is either due to object motion, or caused by camera movements. Object size causes correlation of motion vectors in the spatial domain, while object inertia explains temporal correlation of vector fields. The category of camera motion includes motion due to pans, tilts, and travels of the camera, and zooming with its lens. This type of motion usually causes very smooth velocities in the spatial and in the temporal domain. A zoom with the camera lens results in motion vectors that are linearly changing with the spatial position as illustrated in FIG. 1 in which Vv indicates linearly changing vertical velocities and Vh indicates linearly changing horizontal velocities. A pan, tilt or travel with the camera, on the other hand, causes a uniform motion vector for the entire television screen. These types of motion can be described with a three parameter model, as has been suggested before [13]. Also methods have been suggested in the literature how to extract the parameters of such a model from a rough motion vector field [1]. Even more complex global motion, like rotation, can be described with a parametric model, which than needs up to eight parameters [18]. In this description, we propose to use the rough estimate of the motion vector field in the previous image for generating, with a simple parametric description of this field, an additional prediction vector for every location in the picture. This prediction is included in the candidate set of an advanced efficient block-matcher, that further includes temporal and spatial prediction vectors and an update thereof [14,6]. As the parametric model enables calculation of vectors even at the boundaries of the image and, if required, with sub-pixel accuracy, it can bring a considerable improvement in case of camera motion, particularly if there are areas with little or low-contrast detail near the boundaries of the image, where temporal and spatial predictors sometimes fail.

Section II of this description introduces our notation and summarizes the motion estimation algorithm of [6], which we used as a basis to validate our improvement. Section III introduces the parametric model and the extraction of the additional candidates from previously calculated motion vector fields. Section IV gives an evaluation of the improvement in a critical application (de-interlacing), section V describes how the applicability of MPEG motion vectors can be extended by using the principles of the present invention, and section VI summarizes our conclusions.

II. The 3-D Recursive Search Block-Matcher

As we considered perfection of an advanced motion estimator most interesting, we applied the high quality method of [6]. This algorithm yields a quarter pixel accuracy and a close to true-motion vector field, relevant for scan rate conversion [4,5]. Furthermore, the efficiency of this algorithm is such that it is currently the only single chip true-motion estimator [7,8].

In block-matching motion estimation algorithms, a displacement vector is assigned to the center X of a block of pixels B(X) in the current field n by searching a similar block within a search area SA(X), also centered at X, but in the previous field n−1. The similar block has a center which is shifted with respect to X over the displacement vector D(X, n). To find D(X, n), a number of candidate vectors C are evaluated applying an error measure e(C, X, n) to quantify block similarity.

More formally, $CS^{max}$ is defined as the set of candidate vectors C, describing all possible (usually integer) displacements with respect to X within the search area SA(X) in the previous image:

$$CS^{max} = \{C | -N \leq C_x \leq +N, -M \leq C_y \leq +M\} \quad (1)$$

where N and M are constants limiting SA(X). Furthermore, a block B(X) centered at X and of size X by Y consisting of pixel positions x in the present field n, is now considered:

$$B(X) = \{x | X_x - X/2 \leq x \leq X_x + X/2 \wedge X_y - Y/2 \leq y \leq X_y + Y/2\} \quad (2)$$

The displacement vector D(X, n) resulting from the block-matching process, is a candidate vector C which yields the minimum value of an error function e(C, X, n):

$$D(X, n) \in \{C \in CS^{max} | e(C, X, n) \leq e(F, X, n) \forall F \in CS^{max}\} \quad (3)$$

If, which is the common case, the vector D(x, n) with the smallest matching error is assigned to all pixel positions x in the block B(X):

$$\forall x \in B(X):$$
$$D(x, n) \in \{C \in CS^{max} | e(C, X, n) \leq e(F, X, n) \forall F \in CS^{max}\} \quad (4)$$

rather than to the center pixel only, a large reduction of computations is achieved. As an implication, consecutive blocks B(X) are not overlapping.

The error value for a given candidate vector C is a function of the luminance values of the pixels in the current block and those of the shifted block from a previous field, summed over the block B(X). A common choice, which we will use, is the Sum of the Absolute Differences (SAD):

$$e(\underline{C}, \underline{X}, n) = SAD = \sum_{x \in B(X)} |F(\underline{x}, n) - F(\underline{x} - \underline{C}, n)| \quad (5)$$

Alternatively, a Mean Square Error (MSE) or a Normalized Cross Correlation Function (NCCF) may be used.

Rather than calculating all possible candidate vectors, the 3-D Recursive Search block-matcher of [6], takes spatial and/or temporal "prediction vectors" from a 3-D neighborhood, and a single updated prediction vector. This implicitly assumes spatial and/or temporal consistency. The updating process involves updates added to either of the spatial predictions. We applied a candidate set CS(X, n) containing candidate vectors C, from which the block-matcher selects its result vector D, defined by:

$$CS(\underline{X}, n) = \qquad (6)$$
$$\left\{\underline{C} \in CS^{max} | \underline{C}_1 = D\left(\underline{X} - \binom{X}{Y}, n\right) + \underline{U}(\underline{X}, n) \bigvee \underline{C}_1 = D\left(\underline{X} - \binom{-X}{Y}, n\right) + \underline{U}(\underline{X}, n),\right.$$
$$\left.\underline{C}_2 = D\left(\underline{X} - \binom{X}{Y}, n\right), \underline{C}_3 = D\left(\underline{X} - \binom{-X}{Y}, n\right), \underline{C}_4 = D\left(\underline{X} + \binom{0}{2Y}, n-1\right)\right\}$$

where the two options for candidate vector $C_1$ alternate on block basis, and the update vector U(X, n) is taken from a limited fixed integer update vector set $US_i$, in our case:

$$US_i = \left\{\binom{0}{0}, \binom{0}{1}, \binom{0}{-1}, \binom{0}{2}, \binom{0}{-2}, \binom{1}{0}, \binom{-1}{0}, \binom{3}{0}, \binom{-3}{0}\right\} \quad (7)$$

To realize sub-pixel accuracy, the update set of equation (7) is extended with fractional update values. We realized a quarter pixel resolution by adding the following fractional vectors to the update set:

$$US_f = \left\{ \begin{pmatrix} 0 \\ 0.25 \end{pmatrix}, \begin{pmatrix} 0 \\ -0.25 \end{pmatrix}, \begin{pmatrix} 0.25 \\ 0 \end{pmatrix}, \begin{pmatrix} -0.25 \\ 0 \end{pmatrix} \right\} \quad (8)$$

Because of the small number of candidate vectors, the method is very efficient. Furthermore, due to the inherent smoothness constraint, it yields very coherent vector fields that closely correspond to the true-motion of objects. This particularly, makes it suitable for scanning format conversion.

III. Camera Motion and the Parametric Model

Camera motion includes motion due to panning, tilting, riding, and zooming of the camera. This type of motion has a very regular character causing very smooth velocities i.e. motion vectors, compared to object motion. Zooming with the camera will generate motion vectors that are linearly changing with the spatial position, as illustrated in FIG. 1. Panning, tilting or riding with a camera, on the other hand, will generate a uniform motion vector for the entire television screen.

III.1 A Three Parameter Model

These types of motion can be described with a three parameter model, as has been suggested before [3]:

$$\underline{D}(\underline{x}, n) = \begin{pmatrix} p_1(n) + p_3(n)x \\ p_2(n) + p_3(n)y \end{pmatrix} \quad (9)$$

in which $p_1$ describes the panning, $p_2$ the tilting, and $p_3$ the zooming of the camera. This model is valid only if the blocks are exactly square on the image plane. At least in television this assumption is often invalid, even when the blocks are square on the pixel grid, due to the use of various aspect ratios with fixed sampling frequency.

In these cases a four parameter model can be used according to:

$$\underline{D}(\underline{x}, n) = \begin{pmatrix} p_1(n) + p_3(n)x \\ p_2(n) + p_4(n)y \end{pmatrix} \quad (10)$$

where a fixed ratio results between $p_3$ and $p_4$, which is determined by the ratio of the horizontal (H) and vertical (V) sampling density. If the ratio $p_3/p_4$ does not correspond to the ratio of the H and V sampling density, the extracted parameters must be unreliable. It is possible therefore, by measuring this ratio, to identify situations in which the additional candidate is better not used in the motion estimator.

Extending the model to a six parameter model renders it furthermore possible to include rotations. This type of motion, however, is not very likely in television broadcast material, and therefore not further considered in this description (although not excluded from the claims).

III.2. Upgrading the 3-D RS Block-Matcher with a Parametric Candidate

An implementation of the proposal results by adding a single candidate vector for every block to the set CS(X, n) defined in section II, where this additional candidate C(X, n) for the block B(X) is calculated according to the four parameter model of equation (10), i.e. it results:

$$\underline{C}(\underline{X}, n) = \begin{pmatrix} p_1(n) + p_3(n)X \\ p_2(n) + p_4(n)Y \end{pmatrix} \quad (11)$$

Rather than adding a candidate vector to the motion estimator it is possible to alternate (e.g. on block base) this additional candidate with another candidate vector. In this case the operations count of the estimator hardly increases, while the advantage was found to be comparable. As a consequence candidate vector $C_4$ in equation (6) is modified to:

$$\underline{C}_4(\underline{X}, n) = \begin{cases} \begin{pmatrix} p_1(n) + p_3(n)X \\ p_2(n) + p_4(n)Y \end{pmatrix}, & \text{odd blocks} \\ \underline{D}\left(\underline{X} + \begin{pmatrix} 0 \\ 2Y \end{pmatrix}, n-1\right), & \text{even blocks} \end{cases} \quad (12)$$

A refinement of this thought is to have the occurrence frequency of the parametric model candidate depend on the reliability of the model. In our implementation this led to a further modification of $C_4$ according to:

$$\underline{C}_4(\underline{X}, n) = \begin{cases} \begin{pmatrix} p_1(n) + p_3(n)X \\ p_2(n) + p_4(n)Y \end{pmatrix}, & (\text{odd blocks} \wedge \textit{model reliable}) \\ \underline{D}\left(\underline{X} + \begin{pmatrix} 0 \\ 2Y \end{pmatrix}, n-1\right), & (\text{else}) \end{cases} \quad (13)$$

In the next subsection we will describe a parametric model extraction procedure that allows such a reliability indication.

III.3. Extraction of the Parameters from the Image Data

There are many options to extract the parameters of a global motion model from an estimated motion vector field. In our case where the model is integrated in the 3-D RS Block-Matcher, it makes sense to start from already available motion vectors, i.e. the vectors available in the temporal prediction memory. To keep the operations count low, it is furthermore attractive to use a limited set of the vectors available in this memory only.

As a consequence of the choice to use vectors from the prediction memory, the validity of the candidates generated with the parametric model increases in time due to recursivity of this approach. If the parametric model is valid for significant portions of the image, the additional candidate will be selected by the estimator engine more often, which in the next field improves the quality of the parameters extracted from the vectors in the temporal prediction memory. This again improves the accuracy of the generated additional candidate, it will be selected more often, and the model will improve further, etc.

Figure 2:
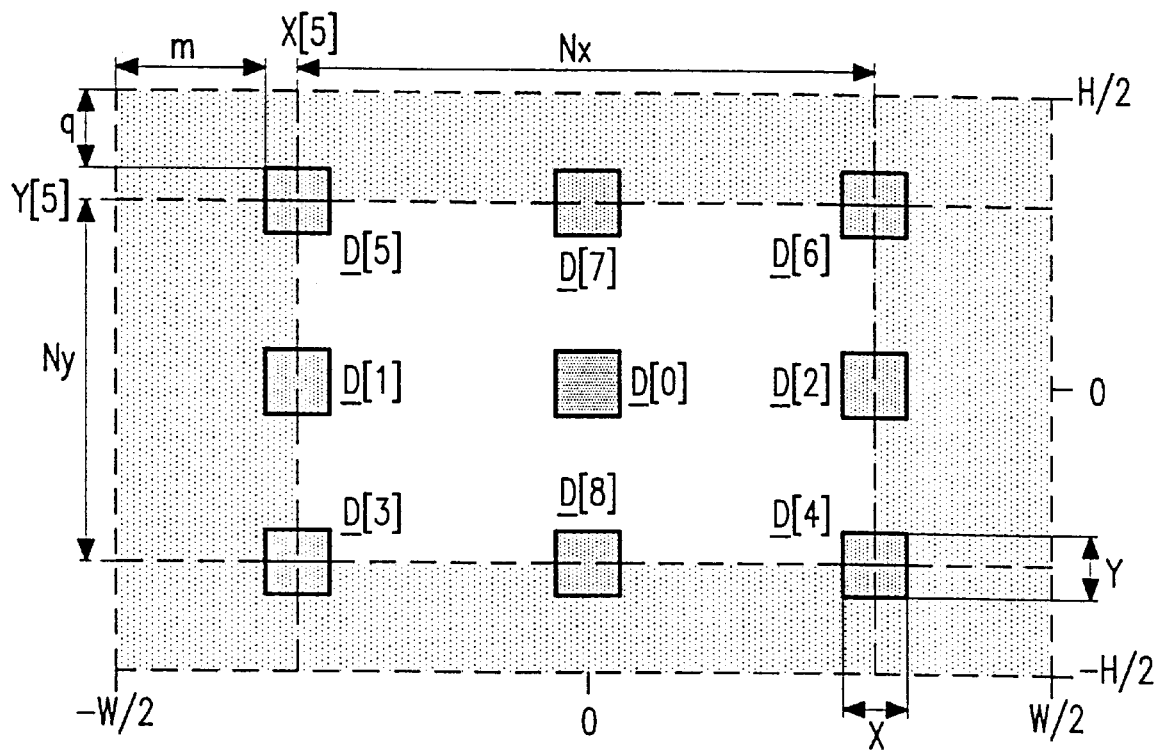
FIG. 2 shows nine vectors taken from the temporal prediction memory of a motion vector estimator.

To estimate the parameters of the model describing the global motion, we look a sample set S(n) containing 9 motion vectors, D(X, n−1) from different positions X on the block grid in a centered window of size (W−2m)X × (H−2q)Y in the picture with width WX and height HY from the temporal vector prediction memory according to:

S(n)={D(X, n−1)|X$_x$=−(W/2−m)X, 0, +(W/2−m)X, X$_y$=−(H/2−q)Y, 0, +(H/2−q)Y}   (14)

where m and q are small and depend on the number of blocks in the image. FIG. 2 illustrates the position in the image from which the vectors in the sample set are taken. Choosing m and q to be small, generally yields a more accurate estimate of the zoom parameters $p_3$ and $p_4$. Vectors too close to the image boundary, however, can be unreliable in case of fast camera motion. It will be clear that other choices are possible that might prove to be better in specific cases, but we see no evident cause for systematical improvement with another set of similar size. Larger sample sets can improve the result, but also increase the calculational burden.

A four parameter model can be solved with four equations, i.e. two "independent" sample vectors. Independent, here, means that these vectors are not taken from the same horizontal or vertical position of the image. The number of combinations to choose r samples from a set of s is known from elementary statistics:

$$\binom{r}{s} = \frac{s!}{(s-r)!r!}, \quad (r, s \in \mathbb{N}^+) \tag{15}$$

In our case we arrive at s=9 and r=2, which implies 36–18=18 options to solve the model, as there are 36 combinations of 2 out of 9, and 18 pairs of "dependent" samples, i.e. samples on the same row or column. There are three rows and three columns, each enabling three pairs of two vectors being selected from the available 3 vectors, so 2×3×3=18 dependent pairs.

Extraction of the parameters from the $i^{th}$ pair of independent sample vectors $D(X_{i1}, n-1)$ and $D(X_{i2}, n-1)$, both in S(n), is straightforward:

$$p_3^i(n) = \frac{D_x(X_{i1}, Y_{i1}, n-1) - D_x(X_{i2}, Y_{i2}, n-1)}{X_{i1} - X_{i2}} \tag{16}$$

and:

$$p_4^i(n) = \frac{D_y(X_{i1}, Y_{i1}, n-1) - D_y(X_{i2}, Y_{i2}, n-1)}{Y_{i1} - Y_{i2}} \tag{17}$$

while:

$$p_1^i(n) = D_x(X_{i1}, Y_{i1}, n-1) - p_3^i(n)X_{i1} \tag{18}$$

and finally:

$$p_2^i(n) = D_y(X_{i1}, Y_{i1}, n-1) - p_4^i(n)Y_{i1} \tag{19}$$

Now for every pair of two independent sample vectors a set of four parameters is available, and the best parameter set has to be selected. We propose here to assign the median value of all options for each parameter to the eventual model parameter. Consequently, for i=1 up to i=18 we rank the individual parameter values such that:

$$\forall i | 2 \leq i \leq 17 \wedge \forall j | 1 \leq j \leq 4: P_j^{i-1}(n) \leq p_j^i(n) \leq P_j^{i+1}(n) \tag{20}$$

and derive the final value of the model parameters according to:

$$\forall j | 1 \leq j \leq 4: p_j(n) = \frac{1}{2}(p_j^9(n) + (p_j^{10}(n))) \tag{21}$$

Finally, the ratio of $p_3$ and $p_4$ is calculated to check the reliability of the model. In the experiments we allowed 25% deviation from the nominal value. If the parameters pass this test and the ratio should be $P_3/p_4 = R$ according to the H and V sampling densities (see section III.1), it is possible to slightly further improve the accuracy of the model by replacing $p_3$ and $p_4$ by their average value after correcting for the different sampling densities ($p_3$ becomes: ($p_3$+R. $p_4$)/2, and $p_4$ becomes: ($p_4$+1/R. $p_3$)/2). This sophistication was implemented in the evaluated algorithm.

In an alternative embodiment which is favorable as it requires less computations than the median algorithm of equations (20) and (21), the set of four parameters for every pair of two independent sample vectors are used in the following manner. The 18 different sets of parameters are cyclically used (one pair for each field) until the model becomes reliable, i.e until a correct p3/p4 ratio is obtained. The set which yielded the correct p3/p4 ratio is maintained until it appears that the p3/p4 ratio is no longer correct. In that case, the parameter sets are again cyclically applied until the correct p3/p4 ratio is obtained again.

There are many options to extract the parameters of a global motion model from an estimated motion vector field. Furthermore, there are many possible motion estimation algorithms in which an additional candidate vector generated with such a parametric motion model could be applied. Another possible implementation of the invention in the 3-D RS block-matching motion estimator of [6] will be described below.

To estimate the parameters of the global motion model, nine vectors, D[0 . . . 8] assigned to different positions in the picture are taken from the temporal vector prediction memory as illustrated in FIG. 2. Four vector values will be selected from this vector set to calculate the parameters. In order to select the most reliable base for the parametric model (the best four vectors out of the nine available ones), first three average x-components $D_{Ax}[q]$ are calculated according to:

$$D_{Ax}[1] = (D_x[1] + D_x[2])/2$$

$$D_{Ax}[2] = (D_x[3] + D_x[4])/2$$

$$D_{Ax}[3] = (D_x[5] + D_x[6])/2 \tag{22}$$

To each of these averages a quality measure $\text{Diff}_x[q]$ is assigned using:

$$\text{Diff}_x[1] = \text{abs}(D_{Ax}[1] - D_x[0])$$

$$\text{Diff}_x[2] = \text{abs}(D_{Ax}[2] - D_x[0])$$

$$\text{Diff}_x[3] = \text{abs}(D_{Ax}[3] - D_x[0]) \tag{23}$$

The background of this quality measure is that the calculated differences should be zero if the vectors are only due to global motion (pan or zooming of the camera). The larger a certain difference is, the larger the chance that the corresponding vectors are a poor base for the parametric model. Similar calculations are required for the vector y-component:

$$D_{Axy}[1] = (D_y[7] + D_y[8])/2$$

$$D_{Ay}[2] = (D_y[6] + D_y[4])/2$$

$$D_{Ay}[3] = (D_y[5] + D_y[3])/2 \tag{24}$$

and:

$$\text{Diff}_y[1] = \text{abs}(D_{Ay}[1] - D_0)$$

$$\text{Diff}_y[2] = \text{abs}(D_{Ay}[2] - D_y[0])$$

$$\text{Diff}_y[3] = \text{abs}(D_{Ay}[3] - D_y[0]) \tag{25}$$

The vector x or y component values belonging to the smallest difference are used to interpolate/extrapolate the new parametric subpixel vector candidate using:

$$x_l = D_x[m], \ (m=1 \vee 3 \vee 5, \wedge \forall q: \text{Diff}_x[m] \leq \text{Diff}_x[q])$$

$$x_r = D_x[m], \ (m=2 \vee 4 \vee 6, \wedge \forall q: \text{Diff}_x[m] \leq \text{Diff}_x[q])$$

$$x_u = D_y[m], \ (m=5 \lor 6 \lor 7, \ \wedge \forall q: \text{Diff}_y[m] \leq \text{Diff}_y[q])$$

$$x_l = D_y[m], \ (m=3 \lor 4 \lor 8, \ \wedge \forall q: \text{Diff}_y[m] \leq \text{Diff}_y[q]) \tag{26}$$

The gradient $p_3$ of the model must be calculated, as well as the parameters $p_1$ and $p_2$ indicating the center of the zoom for respectively the vector x_component and the vector y_component. The gradient $p_3$, is the same for the x_and y_component, due to panning and zooming properties. The gradients are calculated separately. When the separate gradients are significantly different, the parametric vector candidates will be regarded unreliable and this information can be used to modify the occurrence frequency of the parametric candidate as mentioned above. To avoid small disturbances, both gradients are averaged, giving the final gradient $p_3$.

$$p_3 = \left( \frac{(x_r - x_l)}{2N_x} + \frac{(y_l - y_u)}{2N_y} \right) \tag{27}$$

where $N_x$ and $N_y$ are the horizontal and vertical distance measured on the block grid between the positions of the vectors on which the gradient calculation was based. The parameters $p_1$ and $p_2$ can be found by extrapolation, making sure that the interpolation starts at the edges of the vector field:

$$p_1 = x_l - \left( \frac{p_3 X[5]}{N_x} \right) \tag{28}$$

$$p_2 = y_u - \left( \frac{p_3 Y[5]}{N_y} \right)$$

where $X[5]$ and $Y[5]$ are the coordinates of $D[5]$ on the block grid. The parametric vector candidate (one per block) can then be calculated as:

$$C(x, n) = \begin{pmatrix} p_1(n) + p_3(n)X \\ p_2(n) + p_3(n)Y \end{pmatrix} \tag{29}$$

which can than be added to the candidate vector set of any motion estimation algorithm.

It is good to notice that the reliability criterion mentioned above has to be adapted in case of geometrical distortions in the processing between camera and motion estimator. These distortions (e.g. horizontal compression or vertical stretching) are sometimes introduced by circuits for wide-screen television.

IV. Evaluation of the Improvement

The expected advantage of our proposal was an increased accuracy of the estimated motion vectors in case of camera motion. As the original 3-D RS block-matching algorithm is already very accurate, a critical application is required to show the improvement. We found in an earlier stage already [6], that de-interlacing requires a high accuracy from the motion estimator, i.e. the sub-pixel fraction of the estimate plays an important role in the de-interlacing quality. Therefore, here again, we applied the 3-D RS block-matcher in the time-recursive de-interlacing algorithm of Wang et al. [20], to verify the advantage of the parametric candidate vector. We essentially calculate a motion compensated mean square prediction error, similar to what we used in [6], to get an indication of the quality of the motion vectors.

More precisely, the MSE is calculated in the measurement window MW of $(W-2m)X$ by $(H-2q)Y$ pixels, indicated in FIG. 2, between the luminance of the current input field $F(x, n)$ and the previously calculated sequentially scanned picture $F_s(x, n-1)$ shifted over the estimated displacement vector $D(x, n)$:

$$MSE(n) = \frac{1}{(W-2m)X \cdot (H-2q)Y} \sum_{x \in MW} (F(x, n) - F_s(x - D(x, n), n-1))^2 \tag{30}$$

where x runs through all positions in the measurement window on the pixel grid of the odd lines in an odd input field, and through all pixel positions of the even lines in case of an ever input field.

Figure 3:
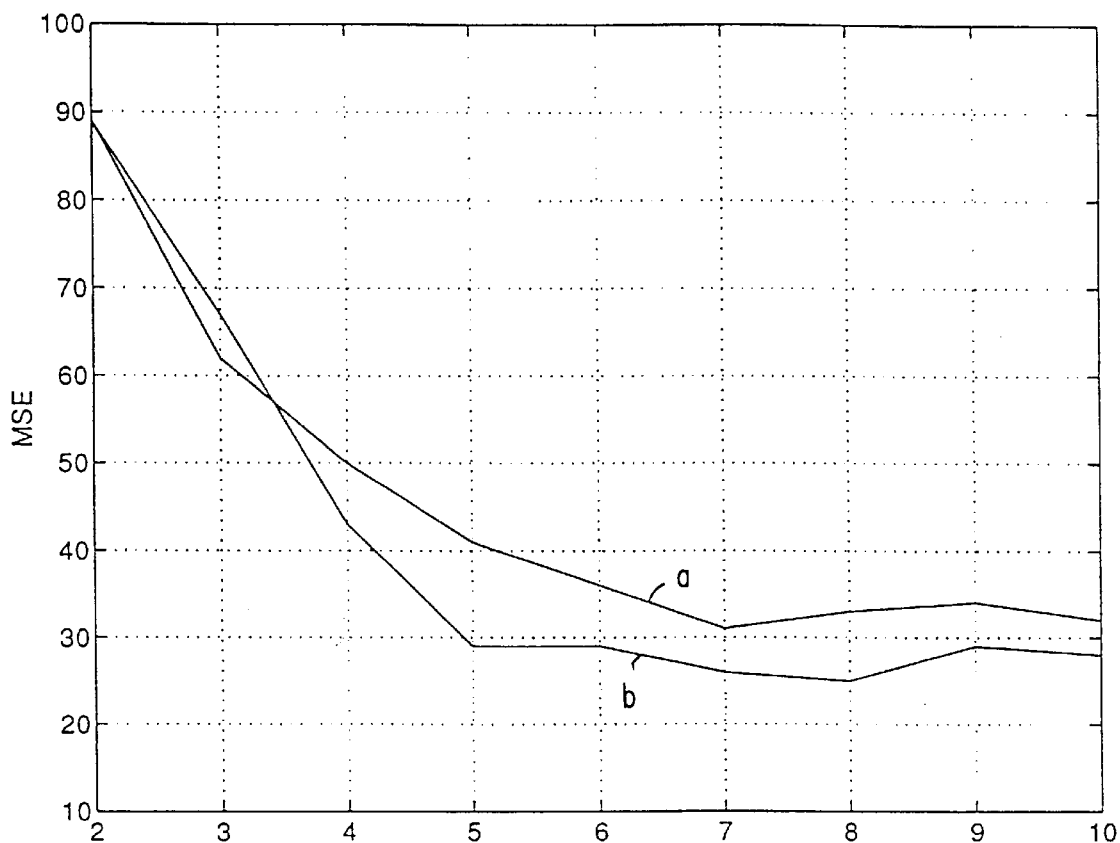
FIG. 3 shows the mean squared errors (MSE) for the 3D-RS block matching motion vector estimation with and without the new parametric vector candidate.

In FIG. 3 we show the value of MSE(n) (vertical axis) for a number of fields (horizontal axis) with (curve b) and without (curve a) the parametric candidate vectors in the estimator of [6]. It can be clearly seen that both algorithms converge in the first fields, and that the parametric candidate gives a significant improvement of the performance in the later fields. The pictures were selected to provide critical test material. The tested sequence contains large areas with much vertical and horizontal detail, and movement in various directions with a large number of (sub-pixel) velocities due to zooming of the camera. It appeared that the additional candidate does not degrade the performance in case no camera motion is present. We found that the MSE score on zooming or panning picture material, was some 12% lower with the new parametric candidate.

Figure 4A:
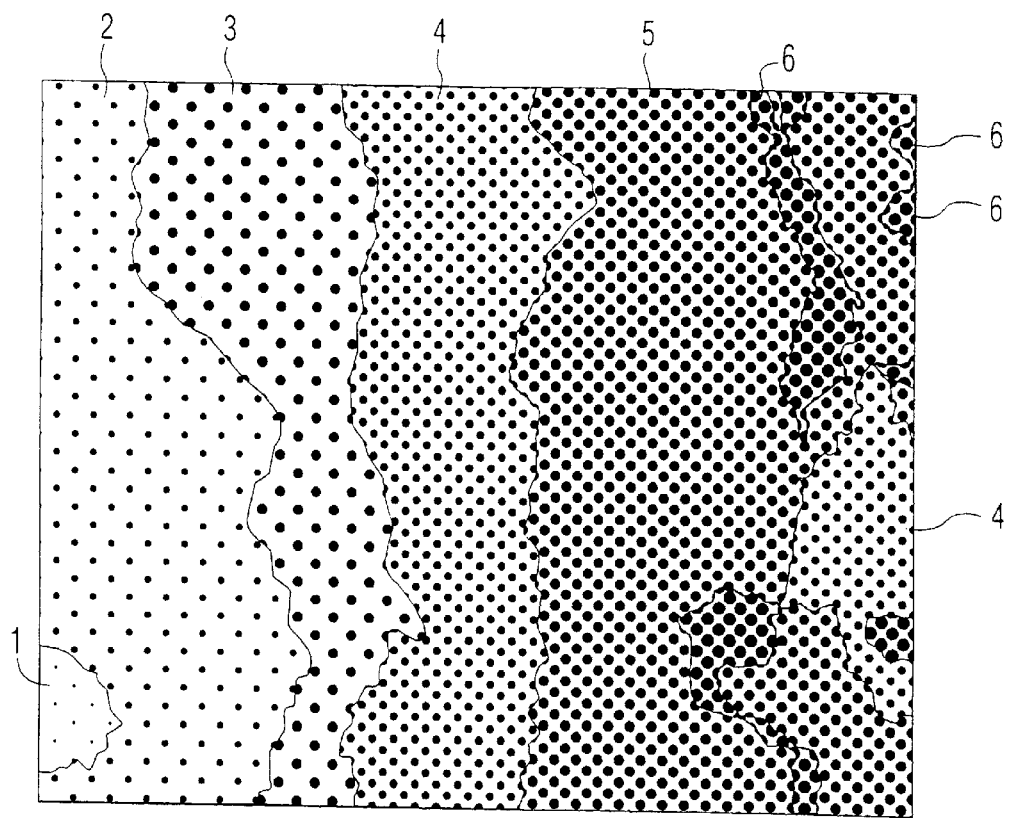
FIG. 4 shows vector x-components without parametric candidate (upper half of FIG. 4), and with parametric candidate (lower half of FIG. 4)
Figure 4B:
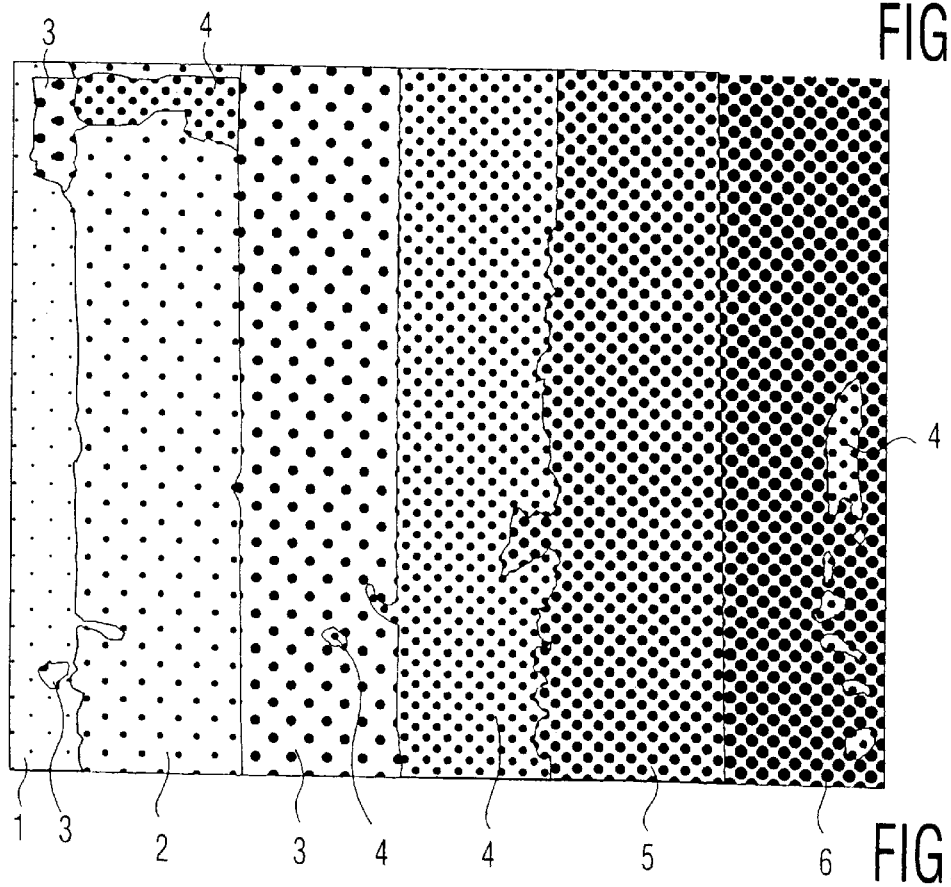
Figure 5A:
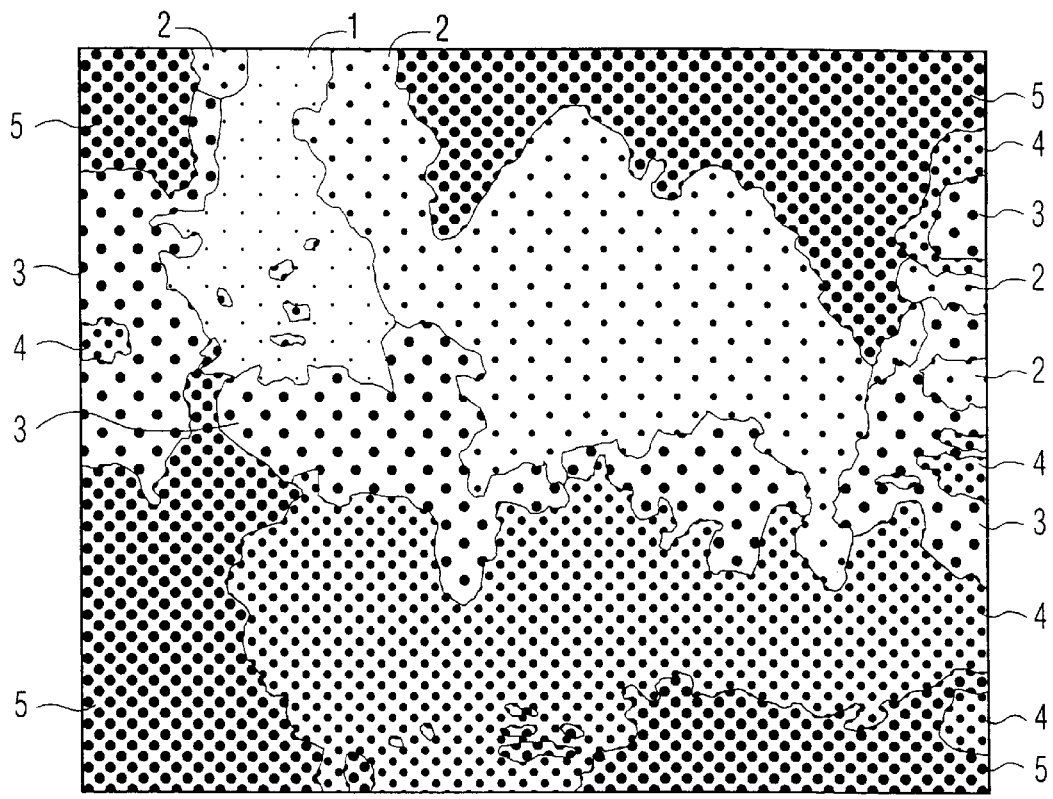
FIG. 5 shows vector y-components without parametric candidate (upper half of FIG. 5), and with parametric candidate (lower half of FIG. 5)
Figure 5B:

FIGS. 4, 5 visualise the results of the proposal. In these figures the simulation results are shown, indicating the velocities with (lower half of FIGS. 4, 5) and without (upper half of FIGS. 4, 5) the parametric vector candidate. The vector x-component is shown in FIG. 4, whereas the vector y-component is shown in FIG. 5. The different shades of grey 1–6 in FIG. 4 and 1–5 in FIG. 5 indicate mutually different motion vector component values. In this case the input for the model was a camera zoom which, as shown in FIG. 1, should result in linearly changing velocities in both the horizontal and the vertical directions. From a comparison between the upper and lower halves of FIGS. 4, 5, it follows that due to the measure of the present invention, the motion estimator accuracy has been greatly improved.

Figure 6:
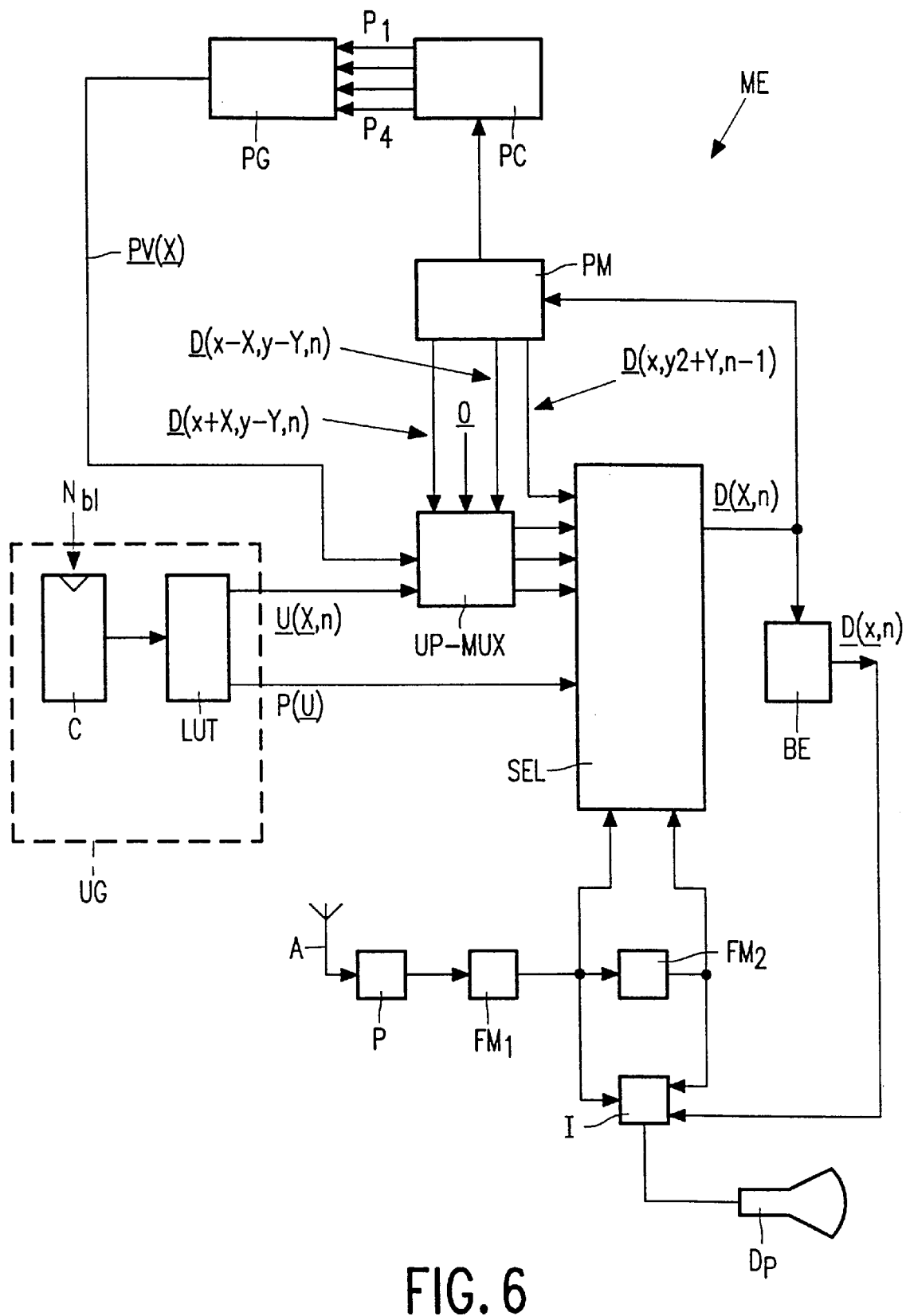
FIG. 6 shows an embodiment of a display apparatus comprising a motion vector estimation device in accordance with the present invention.

FIG. 6 shows an embodiment of a display apparatus comprising a motion vector estimation device in accordance with the present invention. A television signal received by an antenna A is applied to a processing circuit P for tuning, demodulation and video signal processing operations well known to those skilled in the art. An output of the processing circuit P is applied to a first field memory FM1 for obtaining a video signal at a doubled field frequency. An output of the first field memory FM1 is applied to a second field memory FM2 to obtain a field-delayed video signal. An input and an output of the second field memory FM2 are applied to a motion vector estimation arrangement ME to obtain motion vectors $D(x, n)$. The motion vector $DI(x, n)$ and the input and the output of the second field memory FM2 are applied to a motion compensated interpolator I, an output of which is applied to a display unit Dp.

The motion vector estimator ME comprises an update generator UG including a mod p counter C to which a block frequency clock signal $N_{bl}$ is applied. An output of the counter C is applied to a look-up table LUT to obtain update vectors $U(X, n)$ as described above, and an update-dependent penalty $P(U)$ which increases with an increasing update vector length. The update vectors $U(X, n)$ are applied to an update and multiplex circuit UP-MUX which also receives a zero vector 0, a parametric candidate vector PV(X from a parametric candidate generator PG, and previously determined vectors D(x+X, y−Y, n) and D(x−X, y−Y, n) from a prediction memory PM. The update and multiplex circuit UP-MUX applies three candidate vectors to a best matching vector selector SEL which also receives a vector D(x, y+2Y, n−1) from the prediction memory PM. The best matching vector selector SEL furer receives the input and the output of the second field memory FM2, and determines the best vector D(X, n) between a block in a current field and a corresponding group of pixels in a previous field. The best vector D(X, n) is applied to the prediction memory PM, and to a block erosion circuit BE to obtain a motion vector D(x, n) for each pixel x in the block X. From the prediction memory PM, the sample vectors shown in FIG. 2 are applied to a parameter calculator PC to obtain four motion parameters which are applied to the parametric candidate generator PG.

V. Extending the Applicability of MPEG Motion Vectors.

DE-A-195.10.389 [21] discloses a method and a circuit arrangement for receiving coded video signals. The method concerns a video signal which contains a sequence of images with compressed redundancy, e.g. coded in accordance with the MPEG2-standard. The motion decoding is carried out first. The post-processing of the motion-decoded fields, which post-processing essentially contains interpolations, is carried out next together with the processing to remove flicker. Advantageously, the motion vectors retrieved at the motion decoding, are used also for the flicker removal.

As mentioned above, motion estimation can be seen as an optimization problem: a sometimes complex, but usually simple criterion function has to be minimized or maximized to find an output motion vector. There are brute force methods that simply try all possible vectors, in a predefined range, in order to be sure to obtain the global optimum of the criterion function. Also there are efficient approaches that test only the most likely motion vectors. This likelihood is usually determined by spatial or temporal proximity, and consequently temporal and spatial prediction vectors have been popular in the efficient motion estimation algorithms. Depending on the motion estimation algorithm used, the properties of the resulting motion vector fields ace different, so that the application areas of the various motion estimation algorithms are different. Motion vectors can be used in high quality video signal processing, like motion compensated scan conversion, motion compensated noise reduction and image coding. The intended processing puts constraints on various quality aspects of the motion vectors. For example, high quality motion compensated scan conversion requires a motion vector field where the vectors represent the true motion vectors (i.e., true direction and speed) within the image sequence. For coding applications this is irrelevant, as the only quality criterion is a low average prediction error.

Brute force methods like fill search block matching tend not to give true motion vectors. Instead, full search block matching minimizes the error between blocks, so its vectors will connect two blocks that have a minimal error between these two blocks, which is suitable for minimizing the prediction error in coding applications. While these minimal errors work efficiently for compression algorithms like MPEG, the resulting vectors are unsuitable for use in high quality scan conversion. On the other hand, more efficient motion estimators like 3-D recursive block matching tend to give true motion vectors that can be used in high quality scan conversion but which may not be suitable for use in compression algorithms.

With the emergence of MPEG and other types of video compression it is possible to have input video material that already contains motion vectors, so at first sight it may seem that for this type of source material motion estimation at the receiver side is not necessary. However, it is not certain that these motion vectors can be directly used for e.g. scan rate conversion, because it is unknown whether the MPEG motion vectors represent true motion or not. At the decoder/receiver side it is unknown what type of motion estimation algorithm was used at the encoder/transmitter side, so one must assume, as a worst case situation, that the MPEG motion vectors are optimized for an efficient compression and that they do not represent true motion vectors. For example, periodical structures and noise in picture areas with little detail, may cause such inconsistent vectors. Another problem with motion vectors in MPEG data streams is that it is uncertain that all motion vectors are transmitted within the data stream. For these reasons, the technique proposed by [21] seems not to be suitable for high quality post-processing.

In an attempt to solve a similar problem, it has been proposed [22] to smooth the vectors transmitted with a digitally encoded television signal before using these vectors for a field rate upconversion operation.

It is an object of a further aspect of the invention to furnish motion vectors which are suitable for high quality post-processing. This further aspect of the present invention is based on the recognition that the problems described above do not exclude the MPEG motion vectors entirely from use in high quality scan conversion. When an appropriate post-processing is applied, the MPEG motion vectors can be made useful. More specifically, when the receiver is able to determine the quality of the MPEG motion vectors, and when it is able to improve the quality of the MPEG motion vectors so that they meet certain criteria for the intended processing, the MPEG motion vectors can be used. Several possible post processing methods to extend the applicability of the MPEG motion vectors are considered:

1. Process the MPEG motion vectors with an operation like some sort of vector smoothing operation to increase the usability of the MPEG motion vectors.
2. Use the MPEG motion vectors as additional candidates along with spatial and/or temporal candidates in, for instance, a 3-D recursive block matching algorithm, similar to the use of an additional parametric vector candidate as disclosed in the non-prepublished EP priority patent application no. 96201462.7 filed on May 24, 1996.
3. The MPEG motion vectors can be used to calculate the parametric vector candidates described in the non-prepublished EP patent application no. 96201462.7.

Figure 7:
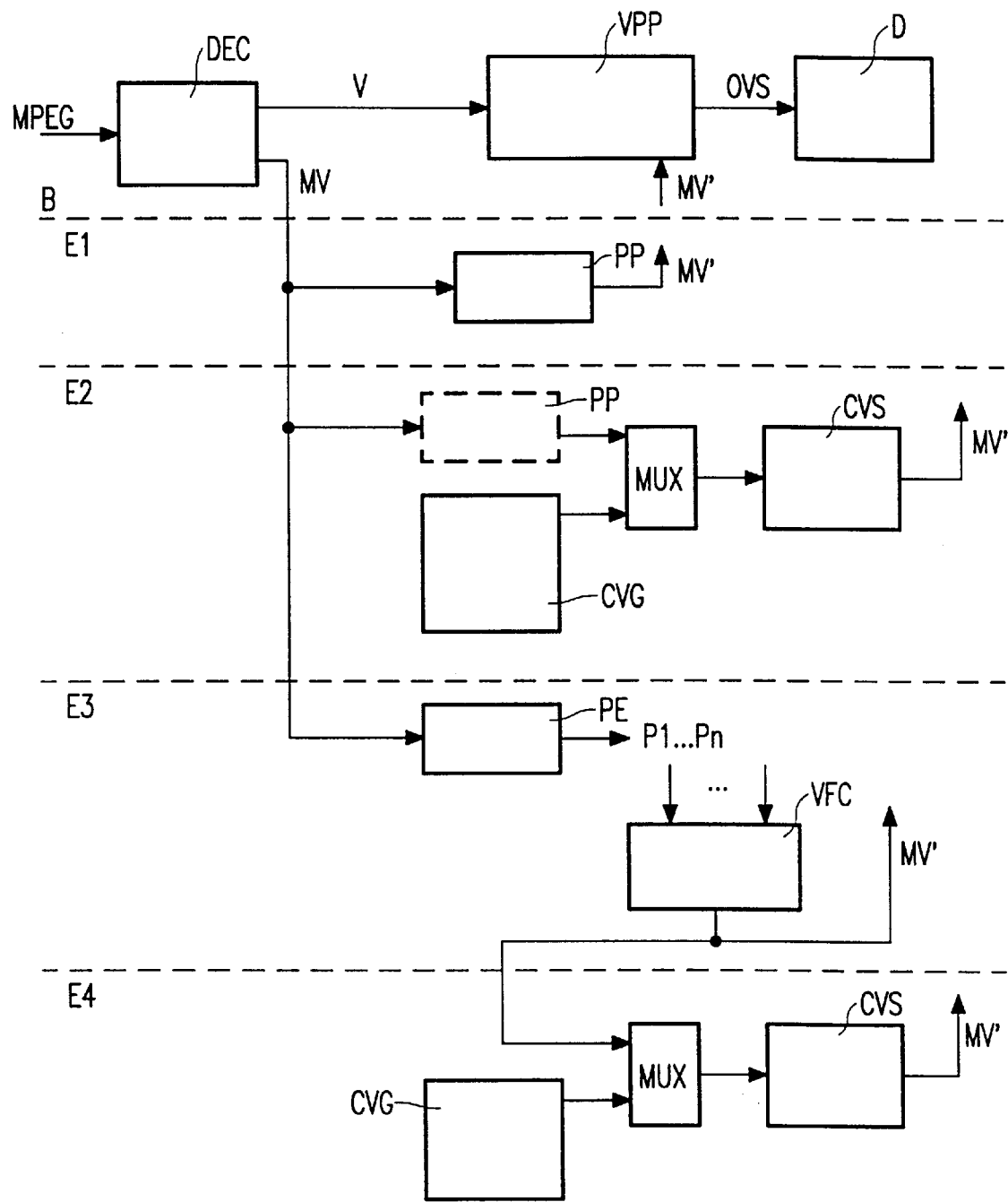
FIG. 7 illustrates in a schematic form various embodiments of an image display apparatus having a motion vector furnishing device in accordance with the present invention.

For a schematic description of the various embodiments, reference is made to FIG. 7.

FIG. 7 shows a basic section B, and four sections E1 . . . E4 showing four distinct ways to augment the basic section B to obtain four distinct embodiments B+E1, B+E2, B+E3, and B+E3+E4 of an image display apparatus.

In the basic section B, an MPEG signal comprising a video signal V and motion vectors MV, is applied to a decoder DEC in order to retrieve the video signal V in dependence upon the motion vectors MV from the MPEG input signal. The video signal V is applied to a video post-processor VPP to obtain an output video signal OVS having a doubled field frequency and/or line frequency or an improved motion portrayal with respect to the video signal V. Alternatively or in addition, the video post-processor VPP reduces noise and/or changes the number of pixels per line and/or lines per field of the video signal V. The video post-processing carried out by the processor VPP is dependent on improved motion vectors MV'. The output video signal OVS is displayed on a display device D.

In accordance with a first embodiment B+E1, the improved motion vectors MV' are obtained from the motion vectors MV contained in the MPEG signal by means of a post-processor PP. For example, a smoothing operation will reduce most of the artifacts which would arise if the MPEG motion vectors MV were directly used for the video post-processing carried out by the processor VPP. A smoothing operation may include separate. low-pass filtering operations on the horizontal and vertical components of the motion vectors. Alternatively, the horizontal and vertical components of the motion vectors can be applied to median filters to replace extreme motion vector component values by existing motion vector component values of motion vectors of neighboring blocks of picture elements.

In accordance with a second embodiment B+E2 which is covered by a copending patent application, the MPEG motion vectors MV are multiplexed by a multiplexer MUX with candidate vectors generated by a candidate vector generator CVG, optionally after a (e.g. smoothing) post-processing operation carried out by the post-processor PP. The multiplexed vectors are applied to a candidate vector selector CVS to obtain improved motion vectors MV' which are expected to show the smallest errors.

In a third embodiment B+E3 which is covered by the claims of the present patent application, a parameter extractor PE extracts motion parameters pl . . . pn from the MPEG motion vectors MV. The motion parameters pl . . . pn are applied to a vector field calculator VFC to obtain the improved motion vectors MV'. The predetermined motion vector recited in claim 1 may be the zero vector.

In a fourth embodiment B+E3 +E4 which is covered by the claims of the present patent application, the motion vectors calculated by the vector field calculator in section E3 are multiplexed with candidate motion vectors from the candidate vector generator CVG, and applied to the candidate vector selector CVS to obtain the improved motion vectors MV'. This fourth embodiment combines the features of the second and third embodiments.

The basic considerations underlying the present aspect of the invention can be summarized as follows. Different motion estimation algorithms will have different applications based on the properties of their resulting vector fields. MPEG video data streams contain motion vectors, which can possibly be used in high quality video processing.

However, it is likely that these MPEG motion vectors are optimized to achieve an efficient compression, so that these vectors cannot be expected to represent the true motion. This means that additional processing is needed to improve their quality and usability for a high quality post-processing. It is proposed to process the MPEG motion vectors at the receiver side. More specifically, the MPEG vectors are used to generate motion parameters which are used to obtain one or more parametric motion vectors which can be used as additional candidate vectors in an efficient motion estimator. In this manner, the applicability of MPEG motion vectors is extended. Obviously, the present aspect of the invention is not limited to MPEG signals; other signals can be treated in the same manner. Reference is made to copending patent applications for features disclosed but not claimed in this application.

VI. Conclusion and Final Remarks

A new motion estimator has been presented. This estimator selects its motion vector for the current image from four candidate vectors only, and is characterized in that one of these candidate vectors is produced with a parametric model describing the global (camera) motion in the previous image.

We introduced this "parametric candidate" in a very efficient (3-D Recursive Search) block-matching algorithm. To this end, we block-alternatingly replaced one of the candidates of this estimator by a candidate generated with a four parameter model. The parameters for the model were extracted once per field using nine widely spaced sample vectors only, taken from the previously estimated vector field. This results in an almost negligible additional processing power requirement for the eventual algorithm. We showed that, with these 9 extracted motion vectors, it is possible to generate 18 sets of 4 parameters describing the camera motion. A median operation was introduced to select the applied parameter set, thus eliminating the outliers due to object motion. Furthermore, we showed that knowledge of the horizontal and vertical sampling densities could be used to judge the reliability of the model. This information provided a means to switch-off the block-alternating injection of the "parametric candidate" in the estimator in case it could lead to a degradation of the estimator performance.

In the evaluation part IV, a significant advantage, up to 50% reduction in MSE, was found on critical material applying the motion vectors for de-interlacing. A photograph of the vector field enabled a subjective evaluation, suggesting that also the fractional part of the displacement vectors obtained from the resulting block-matcher closely correspond to the true-motion in the sequence. Finally, it was shown that the performance of the reliability indicator, although working properly in the experiments, was not too critical.

A preferred embodiment of the invention, providing an efficient true-motion estimator using candidate vectors from a parametric motion model, can be summarized as follows. Efficient motion estimation algorithms are known that select their output motion vector from a limited number of likely correct candidate, or prediction, vectors. In addition to the known spatial and temporal prediction vectors, an additional and independent prediction is proposed. This candidate is generated with a parametric model describing the global motion in a previously estimated motion field. The proposal is elaborated as an addition to the 3-D Recursive Search block-matching algorithm. The evaluation shows that a sub-pixel accurate, true-motion estimator results with a very low operations count.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer.

In the present disclosure, it has been described to use parameters determined on the basis of motion vectors obtained for a preceding field n−1, to obtain motion parameters used in determining an additional vector for the present field n. However, in a conversion from a 50 Hz input signal originating from a 24 Hz movie film, to a 100 Hz output signal, motion vectors determined during a first estimation stage for a given field may be used to obtain parameters for use in a second estimation stage for the same field. Thus, it may happen that field n−1 is the same field as field n.

While a preferred application of the present invention is in a recursive motion estimator, the additional motion parameter-dependent vector may also be applied in other motion estimators like the well-known 3-step block matching algorithm. Thus, the expression predetermined motion vector in the claims includes candidate motion vectors obtained in accordance with any algorithm other than an algorithm in which motion vectors are derived from motion parameters.

In another embodiment in accordance with the present invention, the motion parameters are obtained in accordance with a 2-D histogram algorithm to which all motion vectors for the given field (n−1) are applied, the peaks in the histogram forming the motion parameters. The peaks indicate motion vectors which very often occur in the image and which probably describe a global motion. The motion vectors indicated by the peaks, and/or points of gravity of a cluster of peaks, can be used as additional parametric motion vectors. If there are more peaks than additional motion vectors required, the motion vectors indicated by the peaks can be used in a cyclic manner as additional motion vectors.

The motion vector estimation in accordance with the present invention is preferably applied in a scan format conversion for e.g. converting a 50 Hz field frequency signal into a 100 Hz field frequency signal, for converting a 60 Hz field frequency signal into a 50 Hz field frequency signal, or for converting an interlaced signal into a progressively scanned signal.

VII. References which are all hereby incorporated by reference)

[1] L. Blonde and P. Salmon, European Patent EP-B 0,410, 826.
[2] B. Chupeau, "Multi-Resolution Motion Estimation", *Proc. 4th Int. Workshop on HDTV and Beyond*, Torino, 1991.
[3] Manfred Goetze, "Generation of motion vector fields for motion compensated interpolation of HDTV signals", in *Signal Processing of HDTV*, L. Chiariglione (ed.), Elseviers Science Publishers, 1988.
[4] G. de Haan, P. W. A. C Biezen, H. Huijgen, and O. A. Ojo, "True Motion Estimation with 3-D Recursive Search Block-Matching", *IEEE Transactions on Circuits & Systems for Video Technology*, Vol. 3, October 1993, pp. 368–388.
[5] G. de Haan, P. W. A. C Biezen, and O. A. Ojo, "An Evolutionary Architecture for Motion-Compensated 100 Hz Television", *IEEE Transactions on Circuits & Systems for Video Technology*, Vol. 5, June 1995, pp. 207–217.
[6] G. de Haan and P. W. A. C. Biezen, "Sub-pixel motion estimation with 3-D recursive search block-matching", Signal Processing: *Image Communication*6, 1994, pp. 229–239.
[7] G. de Haan, J. Kettenis and B. De Loore, "IC for motion-compensated 100 Hz TV with smooth-motion movie-mode", *Digest of the ICCE*, June 1995, Chicago.
[8] G. de Haan, J. Kettenis and B. De Loore, "IC for motion-compensated 100 Hz TV with smooth-motion movie-mode", *IEEE Transactions on Consumer Electronics*, to be published in 1996.
[9] J. R. Jain and A. K. Jain, "Displacement Measurement and Its Application in Interframe Image Coding", *IEEE Transactions on Communications*, COM-29, no. 12, 1981.
[10] T. Koga, K. linuma, A. Hirano, Y. lilima and T. Ishiguro, "Motion-Compensated Interframe Coding for Video Conferencing", *IEEE Proc. of the NTC* 81, G5.3.1., New Orleans La, 1981.
[11] H. G. Musmann, P. Pirsch and H. J. Grallert, "Advances in picture coding", *Proc. of the IEEE*, vol. 73, no. 4, April 1985, pp. 523–548.
[12] Y. Ninomiya and Y. Ohtsuka, "A Motion-Compensated Interframe Coding Scheme for Television Pictures", *IEEE Transactions on Communications*, COM-30, no. 1, 1982.
[13] R. Srinivasan and K. R. Rao, "Predictive Coding Based on Efficient Motion Estimation", *IEEE Transactions on Commnunications*, No. 8, 1985, pp. 888–896.
[14] R. Thoma and M. Bierling, "Motion Compensating Interpolation Considering Covered and Uncovered Background", *Signal Processing: Image Communications* 1 (1989), pp. 191–212, Elseviers Science Publishers B. V.
[15] G. A. Thomas, "Television motion measurement for DATV and other applications", *BBC Research Report* No. BBC RD 1987/11.
[16] G. A. Thomas, "TV picture motion measurement", European Patent Application EP-A-0,261, 137.
[17] G. A. Thomas, "HDTV Bandwidth reduction by adaptive subsampling and motion-compensation DATV techniques", *SMPTE Journal*, May 1987, pp. 460–465.
[18] R. Y. Tsai and T. S. Huang, "Estimating three-dimensional motion parameters of a rigid planar patch", *IEEE Transactions on ASSP*, Vol. 29, December 1981, pp. 1147–1152.
[19] P. H. N. de With, "A simple recursive motion estimation technique for compression of HDTV signals", *IEE Conference on Inmage Processing and its Applications*, Maastricht, April 1992.
[20] F.M . Wang, D. Anastassiou, and A. N. Netravali, "Time-Recursive Deinterlacing for IDTV and Pyramid Coding", *Image Communication* 2, 1990, pp. 365–374.
[21] DE-A-195.10.389.
[22] M. S. E. E. graduation report "Bewegingsgecompenseerde interpolatie van digitale televisiebeelden", by L. J. Steenbeek, Delft University of Technology, December 1986, pp. 60–68.

What is claimed is:

1. A method of estimating motion vectors, comprising the steps of:
   determining motion parameters for a first field of a video signal;
   providing at least one predetermined motion vector;
   deriving at least one parameter based motion vector from said motion parameters; and
   determining a motion vector for a second field of said video signal based upon said at least one predetermined motion vector and said parameter based motion vector.

2. A method as claimed in claim 1, wherein said predetermined motion vector includes:
   at least a first previously determined motion vector corresponding to a selected block of pixels selected from a plurality of spatio-temporally neighboring blocks,
   and a second motion vector obtained by adding an update vector to said first previously determined motion vector or to another previously determined motion vector.

3. A method as claimed in claim 1, wherein said motion vectors for said second field of said video signal are based upon a selection from said at least one predetermined motion vector and said at least one parameter based motion vector derived from said motion parameters.

4. A method as claimed in claim 1, wherein said motion parameters for said first field of a video signal are determined from motion vectors determined for said first field.

5. A method as claimed in claim 4, wherein said motion parameters are calculated by determining for each motion parameter, a plurality of parameter candidates from selected motion vectors, and by taking a median of said plurality of parameter candidates to obtain the corresponding motion parameter.

6. A method as claimed in claim 4, wherein said motion parameters are calculated by performing the steps of:
- calculating a plurality of horizontal and vertical difference vector components from a plurality of selected motion vectors in the second field;
- selecting horizontal and vertical vector components corresponding to minimum difference vector components to obtain selected horizontal and vertical vector components; and
- calculating said motion parameters in dependence upon said selected horizontal and vertical vector components.

7. A method as claimed in claim 4, wherein said motion parameters are calculated by determining for each motion parameter, a plurality of parameter candidates from selected motion vectors, and by cyclically applying said plurality of parameter candidates to obtain the corresponding motion parameter until the motion parameter corresponds to an aspect ratio of said video signal.

8. A method as claimed in claim 4, wherein said motion parameters result from a two-dimensional histogram operation on said motion vectors determined for said first field.

9. A method as claimed in claim 1, wherein said motion parameters are determined from motion vectors received with said video signal.

10. A motion vector estimation device, comprising:
- means for determining motion parameters for a first field of a video signal; and
- means for determining motion vectors for a second field of said video signal based upon a predetermined motion vector derived from previous motion vectors and a parameter based motion vector derived from said motion parameters.

11. A video display apparatus, comprising:
- an input for receiving a video signal at a first scan format;
- a motion-compensated interpolation device coupled to said input for providing an output video signal at a second scan format different from said first scan format;
- a display for displaying said output video signal at said second scan format;
- said motion-compensated interpolation device including a motion vector estimation device as claimed in claim 10.

* * * * *